(12) United States Patent
Ju et al.

(10) Patent No.: US 11,557,832 B2
(45) Date of Patent: Jan. 17, 2023

(54) BASE STATION ANTENNA, SEALING MEMBER, AND METHOD AND DEVICE FOR MANUFACTURING THE SEALING MEMBER

(71) Applicant: CommScope Technologies LLC, Hickory, NC (US)

(72) Inventors: Lei Ju, Jiangsu (CN); Peng Xiao, Jiangsu (CN); Hong Ye, Jiangsu (CN); Junfeng Yu, Jiangsu (CN); Qingyun Chen, Jiangsu (CN); Jin Xu, Jiangsu (CN); Yingin Shao, Jiangsu (CN)

(73) Assignee: CommScope Technologies LLC, Hickory, NC (US)

( * ) Notice: Subject to any disclaimer, the term of this patent is extended or adjusted under 35 U.S.C. 154(b) by 454 days.

(21) Appl. No.: 16/822,542

(22) Filed: Mar. 18, 2020

(65) Prior Publication Data

US 2020/0313290 A1    Oct. 1, 2020

(30) Foreign Application Priority Data

Mar. 29, 2019    (CN) .......................... 201910246209.9

(51) Int. Cl.
*H01Q 1/42*    (2006.01)
*H01Q 1/24*    (2006.01)
*B29C 48/00*    (2019.01)
*B29L 31/34*    (2006.01)

(52) U.S. Cl.
CPC .............. *H01Q 1/42* (2013.01); *H01Q 1/246* (2013.01); *B29C 48/0022* (2019.02); *B29C 2793/00* (2013.01); *B29C 2793/0072* (2013.01); *B29L 2031/3456* (2013.01)

(58) Field of Classification Search
None
See application file for complete search history.

(56) References Cited

U.S. PATENT DOCUMENTS

2012/0112415 A1*  5/2012  Benjamin ............ F16J 15/3272
                                                       277/303
2019/0009659 A1*  1/2019  Arimoto ............... E05F 15/689

* cited by examiner

*Primary Examiner* — Robert J Grun
(74) *Attorney, Agent, or Firm* — Myers Bigel, P.A.

(57) ABSTRACT

The present invention relates to a sealing member for a base station antenna and a base station antenna comprising the same as well as a method and device for manufacturing the sealing member. The sealing member (2) is flexible and resilient and is configured to form a seal between an open end (5) of a radome (3) and an end cap (1) of the base station antenna. The sealing member is an elongated sealing strip having two ends, wherein the two ends of the sealing member are lappable with each other, and the sealing member has a groove extending over its entire length, which groove is defined by two side limbs and a bottom limb connecting the two side limbs of the sealing member, wherein the groove is configured to engage with an edge of the open end (5) of the radome, and wherein the sealing member is configured to be received in an annular recess of the end cap (1) and isolate an interior of the radome (3) from the environment. The sealing member can be manufactured cheaply and can be flexibly applied to base station antennas with different sizes.

14 Claims, 3 Drawing Sheets

BASE STATION ANTENNA, SEALING MEMBER, AND METHOD AND DEVICE FOR MANUFACTURING THE SEALING MEMBER

RELATED APPLICATION

The present application claims priority from and the benefit of Chinese Patent Application No. 201910246209.9, filed Mar. 29, 2019, the disclosure of which is hereby incorporated herein in its entirety.

TECHNICAL FIELD

The present invention relates to the field of base station antennas, and more particularly to a sealing member for a base station antenna and a base station antenna comprising the sealing member as well as a method and device for manufacturing the sealing member.

BACKGROUND ART

In a mobile communication network, there are a large number of base stations, each of which may include one or more base station antennas for receiving and transmitting radio frequency (RF) signals. The base station antenna has a radome and antenna assemblies received in the radome, such as a reflector, radiating elements mounted on the reflector, a feeder plate, and the like. The radome may have one or two open ends, which may be enclosed correspondingly by an end cap. A sealing member may be provided between the radome and the end cap so that the antenna assemblies received in the radome may be favorably protected.

Conventionally, sealing members for base station antennas may be sealing rings, wherein individual sealing rings are formed by compression molding and vulcanization of single blanks of raw material. Semi-finished products formed by compression molding may require costly demolding and deburring, which leads to higher material cost and time cost. In addition, a sealing ring having a specific size can only be designated for use in a base station antenna having a corresponding specific size. For base station antennas having different sizes, it is necessary to differently design and manufacture corresponding sealing members, which is also related with high costs.

SUMMARY

It may be an object of the present invention to provide a sealing member for a base station antenna and a base station antenna comprising the sealing member as well as a method and device for manufacturing the sealing member for the base station antenna, wherein the sealing member may be manufactured economically.

According to a first aspect of the invention, a sealing member for a base station antenna is provided. The sealing member is flexible and resilient and is configured to form a seal between an open end of a radome and an end cap of the base station antenna. The sealing member is an elongated sealing strip having two ends that are overlappable with each other. The sealing member has a groove extending over its entire length. The groove is defined by two side limbs of the sealing member and a bottom limb connecting the two side limbs. The groove is configured to engage with an edge of the open end of the radome. The sealing member is configured to be received in an annular recess of the end cap and isolate an interior cavity of the radome from the environment.

In some embodiments, the two side limbs of the sealing member may be configured to be pressed by two flanges of the annular recess.

In some embodiments, at least one of the two side limbs of the sealing member may at least partially increase in thickness with increasing distance from the bottom limb.

In some embodiments, the two side limbs of the sealing member may respectively have incrementally increasing thicknesses with increasing distance from the bottom limb.

In some embodiments, the two ends of the sealing member may have joint elements that are mated with one another.

In some embodiments, the joint elements are configured as form-locking elements that are mated with one another.

In some embodiments, the joint elements may be configured in one of the side limbs of the sealing member. In some embodiments, in an engaged state of the joint elements, the two ends of the sealing member may overlap with each other on the other side limb of the sealing member.

In some embodiments, the bottom limb of the sealing member has arcuate transitions to the two side limbs.

In some embodiments, the sealing member is constructed to be devoid of holes.

According to a second aspect of the invention, a base station antenna is provided. The base station antenna comprises a radome and an end cap, wherein the radome has an open end, and the end cap has an annular recess configured to engage with an edge of the open end of the radome, wherein the base station antenna further comprises a sealing member for a base station antenna according to the first aspect, wherein the sealing member engages with the edge of the open end of the radome by a groove of the sealing member, and the sealing member is received in the annular recess of the end cap and isolate an interior cavity of the radome from the environment.

According to a third aspect of the invention, a method for manufacturing a sealing member for a base station antenna is provided. The method comprises the steps of:
  (a) extruding the blank of raw material formed of rubber and a vulcanizing agent into a continuous sealing strip by an extruder;
  (b) vulcanizing the continuous sealing strip into a finished continuous sealing strip, wherein the finished continuous sealing strip has two side limbs and a bottom limb which define a groove;
  (c) cutting a sealing strip having a predetermined length from the finished continuous sealing strip; and
  (d) forming joint elements that are mated with one another in two ends of the sealing strip having the predetermined length.

In some embodiments, step (a) may include: mixing the rubber raw material and the vulcanizing agent, and making a blank of raw material from the mixture.

In some embodiments, step (b) may include: performing a first stage of vulcanization during extrusion of the blank of raw material in the extruder, and performing a second stage of vulcanization in a vulcanizing device downstream of the extruder.

According to a fourth aspect of the invention, a device for manufacturing a sealing member for a base station antenna is provided, characterized in that the device comprises: a device for providing a blank of raw material to be extruded that is made from a rubber raw material and a vulcanizing agent; an extruder configured to extrude the blank of raw material into a continuous sealing strip; a vulcanizing device configured to vulcanize the continuous sealing strip into a finished continuous sealing strip, wherein the finished continuous sealing strip has two side limbs and a bottom limb which define a groove; and a cutting assembly configured to cut a sealing strip having a predetermined length from the finished continuous sealing strip, and form joint elements that are mated with one another in two ends of the sealing strip having the predetermined length.

BRIEF DESCRIPTION OF THE DRAWINGS

Next, the present invention will be descripted in more details by way of embodiments with reference to the accompanying drawings.

DETAILED DESCRIPTION OF EMBODIMENTS

Figure 1:
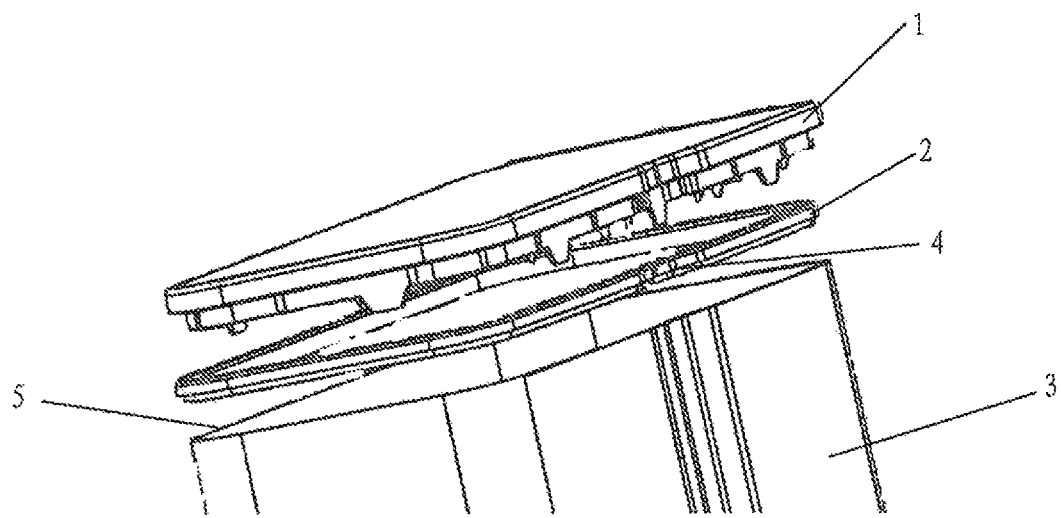
FIG. 1 is a partial exploded schematic perspective view of a base station antenna according to an embodiment.

FIG. 1 is a partial exploded schematic perspective view of a base station antenna according to an embodiment. The base station antenna has a radome 3 with an open bottom end 5. For the sake of clarity, the bottom end 5 is illustrated facing upwards. In FIG. 1, the radome 3 is only illustrated in an area adjacent to the bottom end 5. The radome 3 may have an open top end, or may have a closed top end; an open top end may be enclosed by another end cap and another sealing member. The bottom end 5 of the radome 3 is enclosed by an end cap 1, and a sealing member 2 is provided between the bottom end 5 of the radome 3 and the end cap 1 such that the end cap 1 is sealingly connected to the bottom end 5. The sealing member 2 is an elongated sealing strip having two ends, and the two ends of the sealing member 2 may be overlappable with each other. For the sake of clarity, components such as electrical connectors provided on the end cap 1 are omitted (one of the electrical connectors 6 is visible in FIG. 4).

Figure 2:
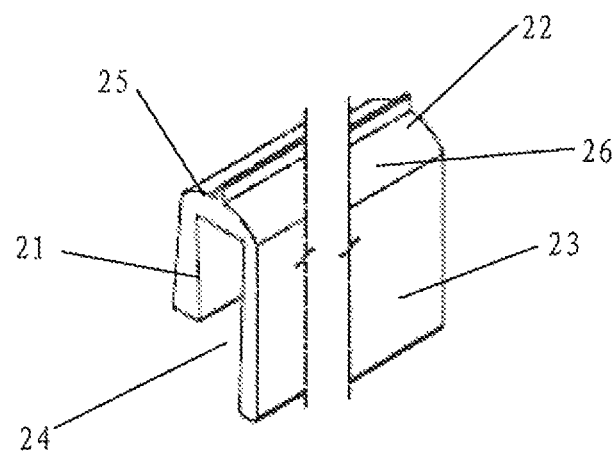
FIG. 2 is a partial perspective view of a sealing member of the base station antenna according to FIG. 1.

FIG. 2 is a partial perspective view of the sealing member of the base station antenna according to FIG. 1. As can be seen in FIG. 2, the sealing member 2 may comprise two side limbs 21, 23 and a bottom limb 22 connecting the two side limbs, which define a groove 24 extending over an entire length of the sealing member. The bottom limb 22 may have an arcuate transition 25 to the side limb 21 and an arcuate transition 26 to the side limb 23. The entire sealing member 2 may be constructed to be devoid of holes in order to enable a fluid-tight seal by means of the sealing member. At least one of the two side limbs 21, 23 of the sealing member may at least partially increase in thickness with increasing distance from the bottom limb 22. In the embodiment shown in FIG. 2, the two side limbs 21, 23 respectively have incre- mentally increasing thicknesses starting from the bottom limb in the height direction, which is advantageous for the fluid-tight seal.

Figure 3A:
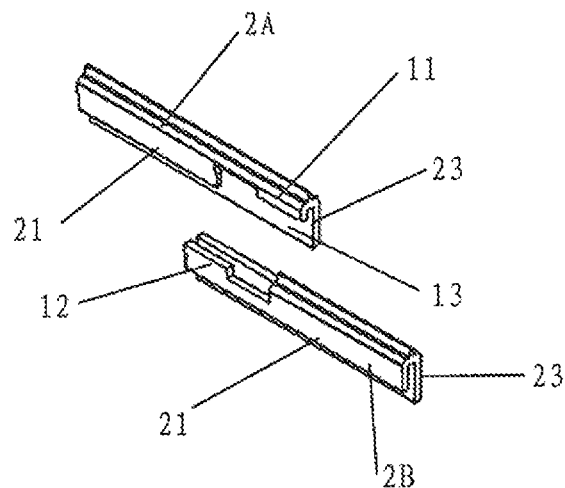
FIG. 3A is a schematic perspective view of the sealing member of the base station antenna according to FIG. 1 in a joint area in a disengaged state.
Figure 3B:
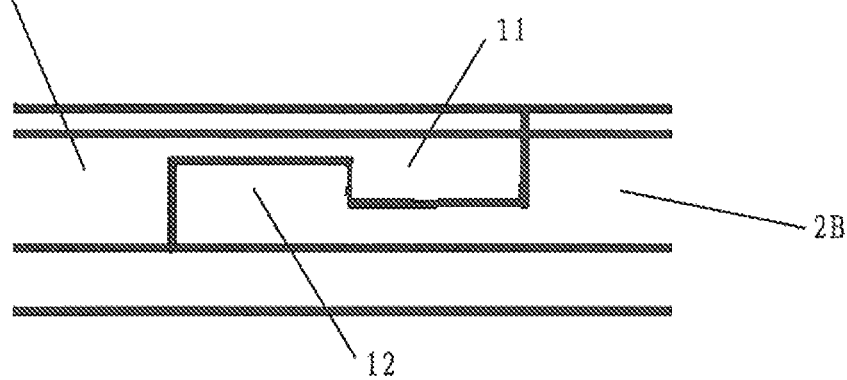
FIGS. 3B and 3C are partially enlarged views of the sealing member of the base station antenna according to FIG. 1 in the joint area as viewed from an exterior of the radome and from an interior of the radome.
Figure 3C:
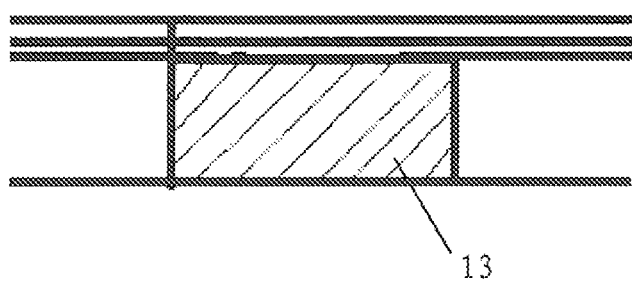

FIG. 3A is a schematic perspective view of the sealing member of the base station antenna according to FIG. 1 in a joint area 4 in a disengaged state, FIG. 3B is a partially enlarged view of the sealing member 2 of the base station antenna according to FIG. 1 in the joint area 4 as viewed from an exterior of the radome 3, and FIG. 3C is a partially enlarged view of the sealing member 2 of the base station antenna according to FIG. 1 in the joint area 4 as viewed from an interior cavity of the radome 3.

In the embodiment shown in FIGS. 3A to 3C, the two ends 2A, 2B of the sealing member 2 have joint elements that are mated with one another, wherein the joint elements may be constructed as form-locking elements 11, 12 that are mated with one another. These form-locking elements 11, 12 may be constructed in the outer side limb 21. These form-locking elements 11, 12 in the engaged state cause the sealing member 2 to form a circumferential sealing ring. In the engaged state of the form-locking elements 11, 12, the two ends 2A, 2B of the sealing member 2 may have an overlapping area 13 on the inner side limb 23, which overlapping area is schematically illustrated by cross-hatching in FIG. 3C. The sealing member 2 has a bigger thickness in the overlapping area 13 than in the remaining area of the sealing member 2. The overlapping area 13 is reinforcedly compressed in an assembled state of the base station antenna, which is advantageous for maintaining the engaged state and for the sealing function of the sealing member 2 in the joint area 4.

In some unillustrated embodiments, the two ends 2A, 2B of the sealing member 2 may also be provided without the form-locking elements 11, 12, and these two ends may overlap with each other in an assembled state of the base station antenna. In other embodiments, the form-locking elements may be constructed as a "dovetail" joint that mates the ends of the sealing member 2. In further embodiments, in the two ends of the sealing member on the inner side limb 23 of the sealing member, form-locking elements that are mated with one another may be provided.

Figure 4:
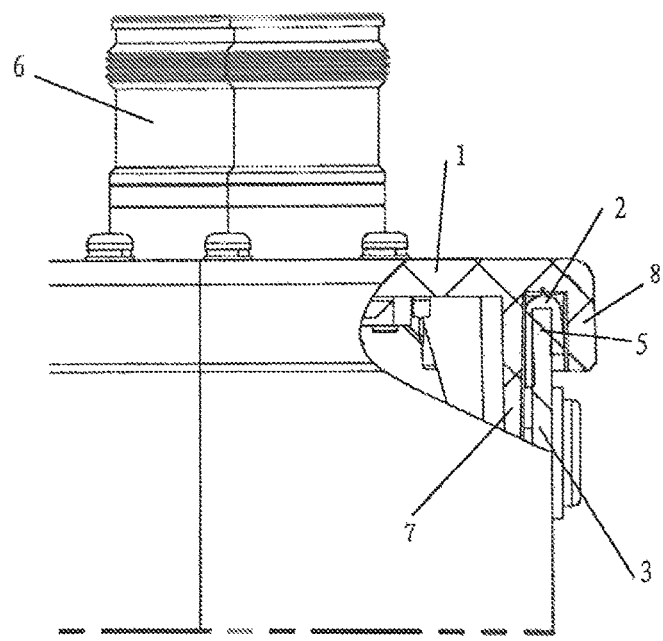
FIG. 4 is a partial enlarged view of the base station antenna according to FIG. 1.

FIG. 4 is a partially enlarged view of the base station antenna according to FIG. 1. As shown in FIG. 4, the groove 24 of the sealing member 2 engages with the edge of the open end 5 of the radome 3, and the end cap 1 has an annular recess. The outer flange 8 of the end cap 1 defining the annular recess may be pressed on the outer side limb 21 of the sealing member 2. The inner flange 7 of the end cap 1 defining the annular recess may be pressed on the inner side limb 23 of the sealing member 2.

Figure 5:
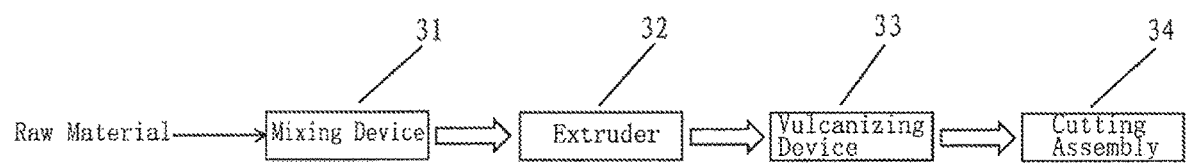
FIG. 5 is a schematic view of a device and method for manufacturing a sealing member for a base station antenna according to an embodiment.

FIG. 5 is a schematic view of a device for manufacturing a sealing member for a base station antenna according to an embodiment. The device may comprise a mixing device 31, in which a rubber raw material and a vulcanizing agent may be mixed such that the mixture may be slit into blanks of raw material to be extruded. The slitting mechanism may be integrated in the mixing device 31 or separately from the mixing device 31. The rubber raw material may include natural rubber or synthetic rubber, for example silicone rubber or fluororubber. The device comprises an extruder 32 configured to extrude the blank of raw material into a continuous sealing strip. A first stage of vulcanization may be achieved during extrusion so that the continuous sealing strip has a certain stability. Downstream of the extruder 32, there may be provided a separate vulcanizing device 33 configured to vulcanize the continuous sealing strip into a finished continuous sealing strip, wherein the finished continuous sealing strip has two side limbs and a bottom limb which define a groove. The device may comprise a cutting assembly 34 configured to cut a sealing strip having a predetermined length from the finished continuous sealing strip, and form joint elements that are mated with one another in two ends of the sealing strip having the predetermined length.

It will be understood that, the terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprise" and "include" (and variants thereof), when used in this specification, specify the presence of stated operations, elements, and/or components, but do not preclude the presence or addition of one or more other operations, elements, components, and/or groups thereof. As used herein, the term "and/or" includes any and all combinations of one or more of the associated listed items. Like reference numbers signify like elements throughout the description of the figures.

The thicknesses of elements in the drawings may be exaggerated for the sake of clarity. Further, it will be understood that when an element is referred to as being "on," "coupled to" or "connected to" another element, the element may be formed directly on, coupled to or connected to the other element, or there may be one or more intervening elements therebetween. In contrast, terms such as "directly on," "directly coupled to" and "directly connected to," when used herein, indicate that no intervening elements are present. Other words used to describe the relationship between elements should be interpreted in a like fashion (i.e., "between" versus "directly between", "attached" versus "directly attached," "adjacent" versus "directly adjacent", etc.).

Terms such as "top," "bottom," "upper," "lower," "above," "below," and the like are used herein to describe the relationship of one element, layer or region to another element, layer or region as illustrated in the figures. It will be understood that these terms are intended to encompass different orientations of the device in addition to the orientation depicted in the figures.

It will be understood that, although the terms "first," "second," etc. may be used herein to describe various elements, these elements should not be limited by these terms. These terms are only used to distinguish one element from another. Thus, a first element could be termed a second element without departing from the teachings of the inventive concept.

It will also be appreciated that all example embodiments disclosed herein can be combined in any way.

Finally, it is to be noted that, the above-described embodiments are merely for understanding the present invention but not constitute a limit on the protection scope of the present invention. For those skilled in the art, modifications may be made on the basis of the above-described embodiments, and these modifications do not depart from the protection scope of the present invention.

What is claimed is:

1. A sealing member for a base station antenna, the sealing member being flexible and resilient and configured to form a seal between an open end of a radome and an end cap of the base station antenna, characterized in that the sealing member is an elongated sealing strip having two ends, the two ends of the sealing member being overlappable with each other, wherein the sealing member has a groove extending over its entire length, which groove is defined by two side limbs and a bottom limb connecting the two side limbs of the sealing member, wherein the groove is configured to engage with an edge of the open end of the radome, and wherein the sealing member is configured to be received in an annular recess of the end cap and isolate an interior cavity of the radome from the environment.

2. The sealing member for the base station antenna according to claim 1, characterized in that the two side limbs of the sealing member are configured to be pressed by two flanges of the annular recess.

3. The sealing member for the base station antenna according to claim 1, characterized in that at least one of the two side limbs of the sealing member at least partially increases in thickness with increasing distance from the bottom limb.

4. The sealing member for the base station antenna according to claim 3, characterized in that the two side limbs of the sealing member respectively have incrementally increasing thicknesses with increasing distance from the bottom limb.

5. The sealing member for the base station antenna according to claim 1, characterized in that the two ends of the sealing member have joint elements that are mated with one another.

6. The sealing member for the base station antenna according to claim 5, characterized in that the joint elements are constructed as form-locking elements that are mated with one another.

7. The sealing member for the base station antenna according to claim 5, characterized in that the joint elements are constructed in one of the side limbs of the sealing member, and in an engaged state of the joint elements, the two ends of the sealing member overlap with each other on the other side limb of the sealing member.

8. The sealing member for the base station antenna according to claim 1, characterized in that the bottom limb of the sealing member has arcuate transitions to the two side limbs.

9. The sealing member for the base station antenna according to claim 1, characterized in that the sealing member is constructed to be devoid of holes.

10. The sealing member according to claim 1, in combination with a base station antenna, the base station antenna comprising a radome and an end cap, wherein the radome has an open end, and the end cap has an annular recess configured to engage with an edge of the open end of the radome, wherein the groove of the sealing member engages with the edge of the open end of the radome, and the sealing member is received in the annular recess of the end cap and isolates an interior cavity of the radome from the environment.

11. A method for manufacturing a sealing member for a base station antenna, comprising the steps of:
 (a) extruding a blank of raw material formed of rubber and a vulcanizing agent into a continuous sealing strip by an extruder;
 (b) vulcanizing the continuous sealing strip into a finished continuous sealing strip, wherein the finished continuous sealing strip has two side limbs and a bottom limb which define a groove;
 (c) cutting a sealing strip having a predetermined length from the finished continuous sealing strip; and
 (d) forming joint elements that are mated with one another in two ends of the sealing strip having the predetermined length.

12. The method according to claim 11, characterized in that the step (a) includes:
   mixing the rubber raw material and the vulcanizing agent, and
   making the blank of raw material from the mixture.

13. The method according to claim 11, characterized in that the step (b) includes:
   performing a first stage of vulcanization during extrusion of the blank of raw material in the extruder, and
   performing a second stage of vulcanization in a vulcanizing device downstream of the extruder.

14. A device for manufacturing a sealing member for a base station antenna, comprising:
   a source for providing a blank of raw material to be extruded that is made from a rubber raw material and a vulcanizing agent;
   an extruder configured to extrude the blank of raw material into a continuous sealing strip;
   a vulcanizing device configured to vulcanize the continuous sealing strip into a finished continuous sealing strip, wherein the finished continuous sealing strip has two side limbs and a bottom limb which define a groove; and
a cutting assembly configured to cut a sealing strip having a predetermined length from the finished continuous sealing strip, and form joint elements that are mated with one another in two ends of the sealing strip having the predetermined length.

* * * * *

UNITED STATES PATENT AND TRADEMARK OFFICE
CERTIFICATE OF CORRECTION

PATENT NO. : 11,557,832 B2
APPLICATION NO. : 16/822542
DATED : January 17, 2023
INVENTOR(S) : Ju et al.

It is certified that error appears in the above-identified patent and that said Letters Patent is hereby corrected as shown below:

On the Title Page

Item (72) Please delete inventors and replace with the following:
Lei Ju, Suzhou (CN); Peng Xiao, Suzhou (CN); Hong Ye, Suzhou (CN); Junfeng Yu, Suzhou (CN); Qingyun Chen, Suzhou (CN); Jin Xu, Suzhou (CN); Yingin Shao, Suzhou (CN)

Signed and Sealed this
Ninth Day of May, 2023

Katherine Kelly Vidal
*Director of the United States Patent and Trademark Office*